United States Patent [19]

Konter et al.

[11] 4,028,434

[45] June 7, 1977

[54] GRAFT POLYMERS OF VINYL PHOSPHONIC ACID ESTERS

[75] Inventors: Wolfgang Konter; Josef Witte, both of Cologne; Peter Vehlewald, Leichlingen; Hans-Dieter Block, Cologne, all of Germany

[73] Assignee: Bayer Aktiengesellschaft, Leverkusen, Germany

[22] Filed: Aug. 14, 1975

[21] Appl. No.: 604,680

[30] Foreign Application Priority Data

Sept. 3, 1974 Germany .......................... 2442101

[52] U.S. Cl. ............................. 260/874; 260/898; 260/895
[51] Int. Cl.² ....................................... C08L 43/00
[58] Field of Search ............................ 260/874, 898

[56] References Cited

UNITED STATES PATENTS

| | | | |
|---|---|---|---|
| 3,188,228 | 6/1965 | Magat | 117/62 |
| 3,418,354 | 12/1968 | Wheeler | 260/448.2 |
| 3,626,027 | 12/1971 | Tanaka | 260/874 |
| 3,627,839 | 12/1971 | Vandenberg | 260/874 |
| 3,676,529 | 7/1972 | Fall | 260/874 |
| 3,763,277 | 10/1973 | Chu | 260/874 |

*Primary Examiner*—Paul Lieberman
*Attorney, Agent, or Firm*—Gene Harsh; Joseph C. Gil

[57] ABSTRACT

The instant invention relates to graft polymers of vinyl phosphonic acid esters, optionally together with nitrogen-containing polymerizable vinyl compounds, on polyalkylene glycols and to a process for their production. The polymers so produced necessarily contain phosphorus and, optionally, nitrogen in the molecule. The polymers are rendered flameproof by the phosphorus and, in addition, self-extinguishing by the nitrogen.

6 Claims, No Drawings

GRAFT POLYMERS OF VINYL PHOSPHONIC ACID ESTERS

DESCRIPTION OF THE INVENTION

The process according to the invention for the production of graft polymers is characterized by the fact that halogen-free vinyl phosphonic acid esters and, optionally, nitrogen-containing polymerisable vinyl compounds are polymerised at temperatures in the range from 5° to 150° C, optionally in an inert organic solvent, in the presence of a polyalkylene glycol free from unsaturation and free-radical initiators or under high-energy radiation.

U.S. Pat. No. 3,875,258 discloses graft copolymers prepared by the in situ polymerization of ethylenically unsaturated monomers, inter alia of bis ($\beta$-chloroethyl) vinyl phosphonate and unsaturated polyols in the presence of a free radical catalyst. However, the halogen-containing products thus obtained are undesirable from an ecological point of view and on burning give rise to the formation of toxic and corrosive hydrogen chloride. Moreover, the unsaturated polyols used in U.S. Pat. No. 3,875,258 have to be prepared by special process.

It has now surprisingly been found that the commercially available saturated polyether polyols, commonly used in the polyurethane chemistry, can also be grafted with vinyl phosphonic acid esters though they contain no ethylenic unsaturation which might be believed to be the reactive site for the free radical catalyst. Unexpectedly, the grafting yields according to the invention are at least as good or even better than when using unsaturated polyols.

Vinyl phosphonic acid esters suitable for use in the process according to the invention include vinyl phosphonic acid alkyl esters having 1 to 6 carbon atoms, the alkyl group of which may be substituted, for example by hydroxyl. Examples of vinyl phosphonic acid alkyl esters of this kind include vinyl phosphonic acid ethyl esters, vinyl phosphonic acid isopropyl esters, and vinyl phosphonic acid $\beta$-hydroxy ethyl esters. Vinyl phosphonic acid methyl esters are particularly preferred.

Suitable polymerisable nitrogen-containing vinyl compounds include amides and imides, which may be optionally N-substituted; nitriles of unsaturated aliphatic monocarboxylic and dicarboxylic acids, such as acrylonitrile, methacrylonitrile, acrylamide, acrylamide-N-methylol ether, methacrylamide and maleic imide, and N-vinyl derivatives of nitrogen-containing 5- and 6-ring heterocyclic compounds, such as N-vinyl pyrrolidone and vinyl pyridine.

Polyalkylene oxides represent suitable base polymers. Particularly suitable base polymers are polyethers based on ethylene oxide and propylene oxide and polytetrahydrofurans having molecular weights of from about 1500 to about 10,000. These polyethers may be straight-chain or branched. They may contain ethylene oxide or propylene oxide groups or both types of groups in admixture with one another. In general, they are obtained in a known manner by condensing ethylene oxide and/or propylene oxide with polyhydric alcohols, such as ethylene glycol, glycerol, trimethylol propane or pentaerythritol. These products are known.

In addition to high-energy radiation, especially UV light, suitable polymerization catalysts may be used as free radical initiators such as azo compounds including azoisobutyrodinitrile, or peroxides such as dialkyl peroxides, hydroperoxides, peroxy acids and their salts (for example peroxy carboxylic acids), peroxy carboxylic acid esters, acryl peroxides, for example di-tert.-butyl peroxide, tert.-butyl peroctoate, benzoyl peroxide and isopropyl peroxy dicarbonates.

Redox initiators of a peroxide and a reducing agent, for example an alkali peroxy disulphate and a sulphite or sulphoxylate, are also suitable.

Solvents suitable for use in the process according to the invention include inert organic solvents including aromatic hydrocarbons such as benzene and xylene, halogenated aromatic hydrocarbons, such as chlorobenzene, and polar solvents such as dimethyl sulphoxide and dimethyl formamide.

The process may be carried out by dissolving the polyalkylene glycol, the vinyl phosphonic acid ester and the initiator in the solvent and reacting the solution at temperatures in the range from about 5° to about 150° C and preferably at temperatures in the range from about 60° to about 110° C. The reaction temperature also depends on the rate at which the initiator decomposes. On completion of the reaction, the polymer may be isolated, for example by evaporating the solvent, generally in vacuo. The process may also be carried out in the absence of solvents.

In some cases, it is of advantages not to add all the vinyl phosphonic acid ester at the beginning of the reaction, but to introduce it gradually during the reaction.

In general, from 5 to 50 parts by weight and preferably from 10 to 30 parts by weight of vinyl phosphonic acid ester and, from 0 to 30 parts by weight, preferably from 2 to 20 parts by weight, of the nitrogen-containing vinyl compound are used per 100 parts by weight of polyalkylene oxide.

Polymerization of the vinyl phsophonic acid ester in the presence of the polyalkylene glycols results in the formation of graft polymers. In other words, the vinyl phosphonic acid esters are polymerized onto the polyalkylene glycols as side chains to form a uniform product. Vinyl phosphonic acid alkyl ester homopolymers are formed, if at all, only to a limited extent.

In order to obtain as complete a graft as possible, sufficient radicals have to be available in each phase of the reaction. Accordingly, the initiator is generally used in a quantity of from 0.5 to 10% by weight and preferably in a quantity of from 1 to 5% by weight, based on the weight of the reactants.

The graft polymerization reaction may be carried out continuously or in batches. In batch operation, the reaction may be carried out in conventional stirrer-equipped reactors. Polymerization may be carried out continuously by passing the polyalkylene glycol together with the vinyl phosphonic acid ester and the initiator through a polymerization zone and by providing for an adequate residence time. This can be done in a cascade of stirrer-equipped vessels or in a flow tube. It is preferred to use a flow tube because, in this case, the polymerization temperature can be readily controlled and the residence-time spectrum may be kept narrow, so that the graft polymers obtained have greater chemical uniformity.

The resulting polyalkylene oxides grafted with vinyl phosphonic acid esters may be used for the production of flameproof polyurethanes. As is well known, polyurethanes, especially polyurethane foams, are generally produced by reacting polyethers with polyisocyanates, optionally in the presence of catalysts. If part of the conventional polyether is replaced by the products according to the invention, the polyurethane foams obtained show an almost 50% reduction in their burning rate when subjected to a fire test. In these products, the flame-proofing phosphorus atoms, and the nitrogen required for making the foams self extinguishing are permanently incorporated into the polymers. Accordingly, there is no danger of an additive being incompatible, nor is there any danger of the flameproofing agent migrating, as is the case with flameproofing additives.

EXAMPLE 1

100 g of polypropylene oxide (molecular weight [numerical average] 3000, OH-number 56) and 40 g of vinyl phosphonic acid methyl ester are introduced into a 250 ml capacity flask. The flask is repeatedly evacuated and filled with nitrogen. A solution of 200 ml of toluene and 15 g of azodiisobutyro dinitrile is then added dropwise in the nitrogen atmosphere, followed by heating to 80° C. Reaction time: 14 hours.
Yield: 98%.
P theoretical 6.3% P found = 6.0%
N theoretical 2.1% N found = 1.9%

EXAMPLE 2

100 g of ethylene oxide/propylene oxide copolymer (OH number 49, molecular weight [numerical average] 3200), 25 g of vinyl phosphonic acid methyl ester and 15 g of azo diisobutyrodinitrile are dissolved in 230 ml of toluene, the reaction flask repeatedly evacuated and pressure-equalized with nitrogen. The reaction solution is heated to 90° C and reacted with stirring for about 8 hours. The graft polymer is freed from dinitrile in benzene and then dried in a thin layer evaporator at 100° C/15 mm Hg.
Yield: 81%
P theoretical 4.5% P found = 1.9%
N theoretical 2.4% N found = 0.9%

EXAMPLE 3

A solution of 500 g of vinyl phosphonic acid methyl ester, 300 g of azodiisobutyrodinitrile and 4600 ml of toluene is slowly added dropwise at 110° C in a nitrogen atmosphere to 2000 g of polypropylene oxide (molecular weight [numerical average] 3000, OH number 56). After the dropwise addition, the mixture is reacted for 4 hours at the same reaction temperature. Drying is carried out in a thin-layer evaporator at 100° C/3 Torr.
Yield: 95%
P theoretical 4.5% P found = 3.9%
N theoretical 2.4% N found = 1.6%

EXAMPLE 4

100 g of polypropylene oxide (molecular weight [numerical average] 6400) are freed from atmospheric oxygen by repeated evacuation and pressure equalization with nitrogen. A solution of 40 g of vinyl phosphonic acid methyl ester, 10 g of acrylamide and 5 g of tert.-butyl peroctoate is added dropwise over a period of 30 minutes to the polypropylene oxide after it has been heated to 100° C. After the dropwise addition, the mixture is left to react for 4 hours.
Yield: 95%
P theoretical 6% P found = 5.9%
N theoretical 1.3% N found = 1.1%

EXAMPLE 5

50 g of polypropylene oxide (molecular weight [numerical average] 3000, OH number 56) are repeatedly evacuated in a reaction vessel, pressure-equalized with nitrogen and then heated to 80° C. This is followed by the addition over a period of 2 hours of a solution of 50 g of propylene oxide (molecular weight [numerical average] 3000, OH number 56), 10 g of vinyl phosphonic acid dimethyl ester, 5 g of acrylamide and 5.75 g of tert.-butyl peroctoate. After the dropwise addition, the reaction is continued for 6 hours, the graft polymer is precipitated in diethyl ether.
Yield: 97%
P theoretical 1.9% P found = 1.8%
N theoretical 0.8% N found = 0.8%

EXAMPLE 6

A solution of 20 g of vinyl phosphonic acid dimethyl ester, 10 g of acrylamide and 6.5 g of tert.-butyl peroctoate, is added at 90° C to 100 g of polyethylene glycol (molecular weight [numerical average] 5000) through a dropping funnel equipped with cooling means. After the addition, the reaction is continued for 5 hours. The graft polymer is obtained in a yield of 95% by precipitation is diethyl ether.
P theoretical 3.4% P found 3.2%
N theoretical 1.5% N found 1.4%

The fractions obtained by the precipitation had the same phosphorus and nitrogen contents within the limits of analytical accuracy.

EXAMPLE 7

1000 g of polyethylene glycol (molecular weight [numerical average] 3000), 100 g of vinyl phosphonic acid methyl ester, 20 g of acrylamide, 54 g of tert.-butyl peroctoate are pumped from a cooled container protected against light through a stainless steel spiral (4mm diameter, 15 m long) accommodated in an oil bath heated to 100° C. The pumping rate is selected in such a way that the residence time in the spiral corresponds to about 10 half lives of the initiator.
Yield: 98%
P theoretical 2.0% P found = 1.9%
N theoretical 0.34% N found = 0.30%

EXAMPLE 8

50 g of polyethylene glycol (molecular weight [numerical average] 5000), 5 g of vinyl phosphonic acid methyl ester and 0.55 g of tert.-butyl peroctoate, are heated to 100° C. Total reaction time: 4 hours. The polymer is precipitated in isopropanol and dried in a drying cabinet at 70° C/15 Torr.
Yield: 92%
P theoretical 2.1% P found = 1.55%

EXAMPLE 9

A solution of 50 g of polyethylene glycol (molecular weight [numerical average] 10,000), 10 g of vinyl phosphonic acid methyl ester and 0.6 g of tert.-butyl peroctoate, is pumped through a stainless steel spiral (4 mm diameter, 15 m long) accommodated in an oil bath kept by a thermostat at 100° C. The residence time in the spiral corresponded to 10 half lives of the peroctoate. The graft polymer is precipitated in isopropanol and dried in a vacuum drying cabinet at 90° C/15 mm Hg.
Yield: 90%
P theoretical = 3.8%
P found = 3.50%

EXAMPLE 10

A solution of 25 g of vinyl phosphonic acid methyl ester and 0.75 g of tert.-butyl peroctoate is slowly added dropwise at 100° C to 50 g of polyethylene glycol (molecular weight [numerical average] 5000). After the dropwise addition, graft polymerization is continued for 2 to 3 hours. The graft polymer is precipitated in isopropanol and dried in vacuo.

Yield: 66%
P theoretical = 7.6%
P found = 5.8%

EXAMPLE 11

100 g of polyethylene glycol (molecular weight [numerical average] 5000) are heated under nitrogen to 100° C. This is followed by the dropwise addition over a period of 2 hours of a solution of 20 g of vinyl phosphonic acid diethyl ester and 4 g of tert.-butyl peroctoate. After a total reaction time of 10 hours, the graft polymer is precipitated in diethyl ether and dried at 50° C in a vacuum of 15 Torr.

Yield: 97%
P theoretical = 3.1%
P found = 2.8%

EXAMPLE 12

100 g polypropylene oxide (molecular weight [numerical average] 6400) are freed from atmospheric oxygen by evacuation and pressure equalization with nitrogen. A solution of 10 g of vinyl phosphonic acid dibutyl ester and 5.5 g of tert.-butyl peroctoate is added over a period of 2 hours to the polypropylene oxide after it has been heated to 90° C. After a reaction time of 7 hours, the product is precipitated in diethyl ether and dried in vacuo at 50° C.

Yield: 94%
P theoretical = 1.3%
P found = 1.1%

It was not possible to trace any homopolymer by gel chromatography.

What is claimed is:
1. A graft polymer of
   a. from 5 to 50 parts by weight of halogen-free vinyl phosphonic acid alkyl ester
   b. from 0 to 30 parts by weight of nitrogen-containing polymerizable vinyl compound and
   c. a polyalkylene oxide free from unsaturation having a molecular weight of from 1500 to 10,000 the amounts of components (a) and (b) being based on 100 parts by weight of component (c).
2. A graft polymer according to claim 1, wherein component (a) is vinyl phosphonic acid methyl ester, component (b) comprising from 2 to 20 parts by weight and is selected from the group consisting of acrylamide, methacrylamide, acrylonitrile and methacrylonitrile, and component (c) is a polyethylene oxide.
3. A process for the production of graft polymers, wherein vinyl phosphonic acid esters and, optionally, copolymerizable nitrogen-containing vinyl compounds are polymerized at temperatures in the range from 5° to 150° C, in the presence of a polyalkylene glycol and radical catalysts or under high-energy radiation.
4. A process as claimed in claim 3, wherein the polymerization reaction is conducted in an inert organic solvent.
5. A process as claimed in claim 3, wherein from 5 to 50 parts by weight of vinyl phosphonic acid esters from 0 to 30 parts by weight of the nitrogen-containing vinyl compound are grafted onto 100 parts by weight of polyalkylene glycol.
6. A process as claimed in claim 5, wherein vinyl phosphonic acid methyl ester and acrylamide, methacrylamide, acrylonitrile or methacrylonitrile are grafted onto polyethylene oxide or polypropylene oxide.

* * * * *